United States Patent [19]

Takenouchi et al.

[11] Patent Number: 4,519,008
[45] Date of Patent: May 21, 1985

[54] METHOD OF RECORDING AND REPRODUCING VISUAL INFORMATION IN AUDIO RECORDING MEDIUM AND AUDIO RECORDING MEDIUM RECORDED WITH VISUAL INFORMATION

[75] Inventors: Tsutomu Takenouchi; Tsunehiko Nagasawa; Masatada Nanasawa, all of Tokyo, Japan

[73] Assignee: Toshiba-EMI Limited, Tokyo, Japan

[21] Appl. No.: 430,671

[22] Filed: Sep. 30, 1982

[30] Foreign Application Priority Data

May 31, 1982 [JP] Japan ................................. 57-92618

[51] Int. Cl.³ ...................... G11B 31/00; H04N 5/782
[52] U.S. Cl. ....................................... 360/79; 360/32; 360/33.1; 358/335
[58] Field of Search ............. 358/335; 360/33.1, 37.1, 360/79, 8, 9.1, 35.1, 32, 39; 340/706, 723, 724, 726, 792

[56] References Cited

U.S. PATENT DOCUMENTS 3,680,077  7/1972  Hoberecht ......................... 340/726
3,913,135 10/1975  Damlamian ........................ 360/79
3,919,716 11/1975  Yumde et al. ..................... 360/9.1
4,016,361  4/1977  Pandey ............................. 360/33.1
4,423,444 12/1983  Humphreys ........................ 360/79

FOREIGN PATENT DOCUMENTS 1026468  4/1966  United Kingdom .

Primary Examiner—Raymond F. Cardillo, Jr.

[57] ABSTRACT

A method of recording visual information such as words of a song in an audio recording medium and reproducing the same is provided. Picture information obtained through a TV camera is quantized into pulse signals. Using these pulse signals, a sine wave signal having an audio frequency band is modulated. Further, synchronizing signals are added to the modulated signal at predetermined intervals to form a character signal. Said character signal is recorded in one of the two channels of an audio recording medium where as a musical accompaniment is recorded in another channel. When played, such character signal is reproduced on a display screen such that a user can read the words to sing the song to the simultaneously reproduced accompaniment.

4 Claims, 3 Drawing Figures

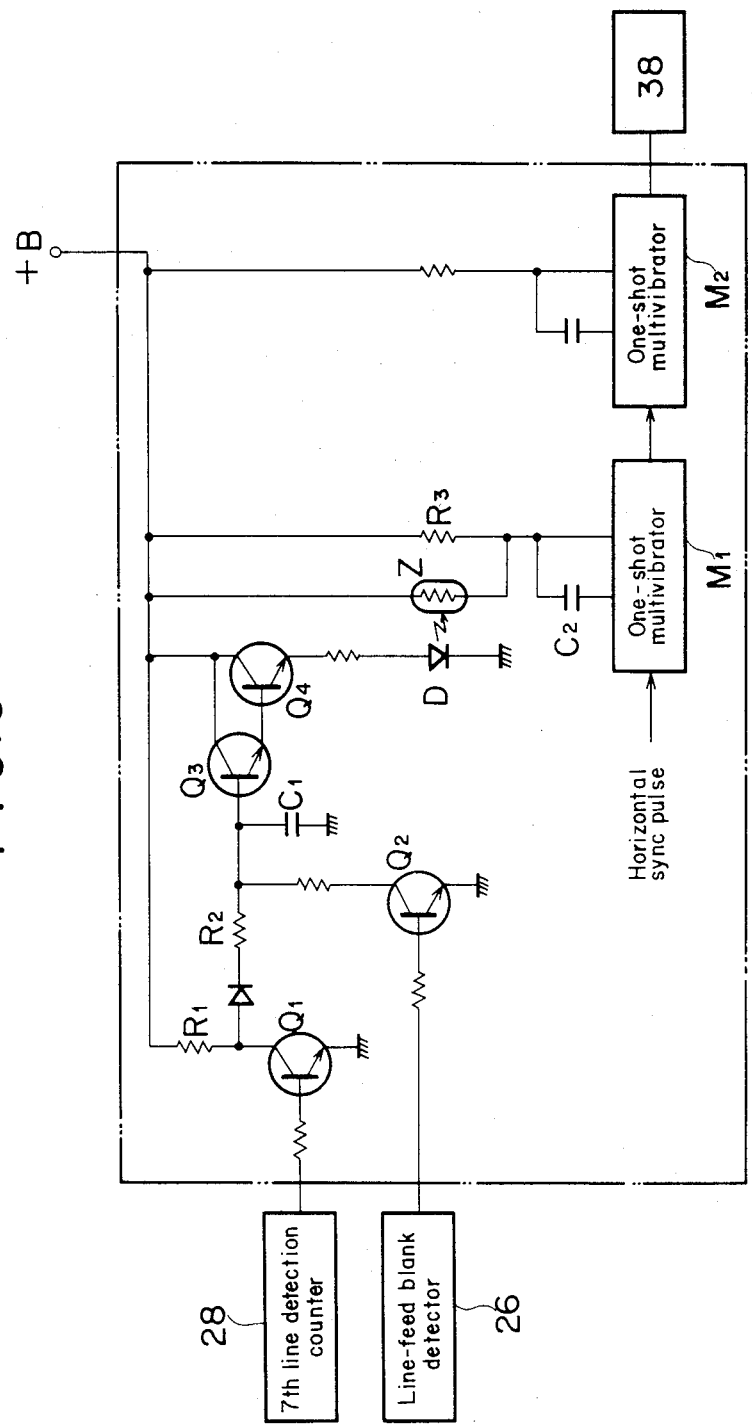

METHOD OF RECORDING AND REPRODUCING VISUAL INFORMATION IN AUDIO RECORDING MEDIUM AND AUDIO RECORDING MEDIUM RECORDED WITH VISUAL INFORMATION

BACKGROUND OF THE INVENTION

The present invention relates to a method of recording and reproducing both audio and character signals, such as for characters and numerals on an audio magnetic tape or disk. The invention also relates to a recording medium with both audio and character signals recorded thereon, and furthermore relates to a method of moving character images on the display screen wherein lines of characters are moved slowly so that an oldest line of characters are scrolled off and a new line of characters are displayed when the display screen, such as a CRT display or the like, has overflowed with characters.

Recently, it has become increasingly popular to sing with karaoke or learn English comversation at home using audio magnetic tapes and disks. (Note: Karaoke is a tape recorded accompaniment for amature singers.) However, in singing with karaoke, it is necessary to prepare text cards in which words are written, and therefore it is troublesome to store such text cards and at the same time it is difficult to read a card in a dark place such as for example a snack bar and the like. In using for learning English comversation etc., it is troublesome to open the text book and read the sentence while listening to the played audio tape or disk, making it difficult to accustom a person to the learning.

Moreover, in serial transmission of digital data representing the visual information, commands for starting display, line feeding and clearing RAM are coded in digital, causing the command decoding circuit to become complex and expensive, and eventually this method is not to be used for karaoke equipment and language learning equipment. If it is merely requested to display simple images such as characters on the CRT screen, imperfect images on the screen and line feed caused by a dropout of data during transmission will not pose a serious problem practically.

Besides, in the conventional display system such as a word processor, characters are displayed sequentially on the CRT screen, and when the screen overflows with characters, the first line of characters are removed from the screen and the next line of characters are displayed additionally. In this case, when a character line is replaced with new one all character lines move instantaneously, causing the reader to lose reading position.

SUMMARY OF THE INVENTION

It is therefore an object of the invention to provide a method, wherein visual information such as characters is processed in the form of audio signal and the audio signal is recorded together with the sound-purpose signal on a magnetic tape or disk, and thereafter these signals are reproduced for providing acoustic and visual information through a loudspeaker and on a cathode ray tube (CRT).

It is another object of the present invention to provide a method of recording and reproduction for an audio recording medium and a recording medium for use in the method, wherein visual information such as characters is recorded in the form of audio signal, and commands for starting display and line feed on the CRT screen and a command for clearing RAM are represented by unrecorded periods in respective durations on the recording medium, thereby allowing a simple and inexpensive circuit arrangement.

It is a further object of the present invention to provide a method of moving character images on the display screen which performs a slow movement of character lines by combined use of an analog time constant circuit with digital circuitry and also allows the circuit arrangement to be simple and inexpensive.

It is a still further object of the present invention to provide an audio recording medium recorded with an image-purpose signal in the form of an audio signal.

BRIEF DESCRIPTION OF THE DRAWINGS

A preferred embodiment of the present invention will be described with reference to the accompanying drawings in which:

FIG. 3 is a schematic diagram showing the scroll controller used in the arrangement of FIG. 2.

DESCRIPTION OF THE PREFERRED EMBODIMENT

An embodiment of the present invention will now be described with reference to the drawings.

Figure 1:
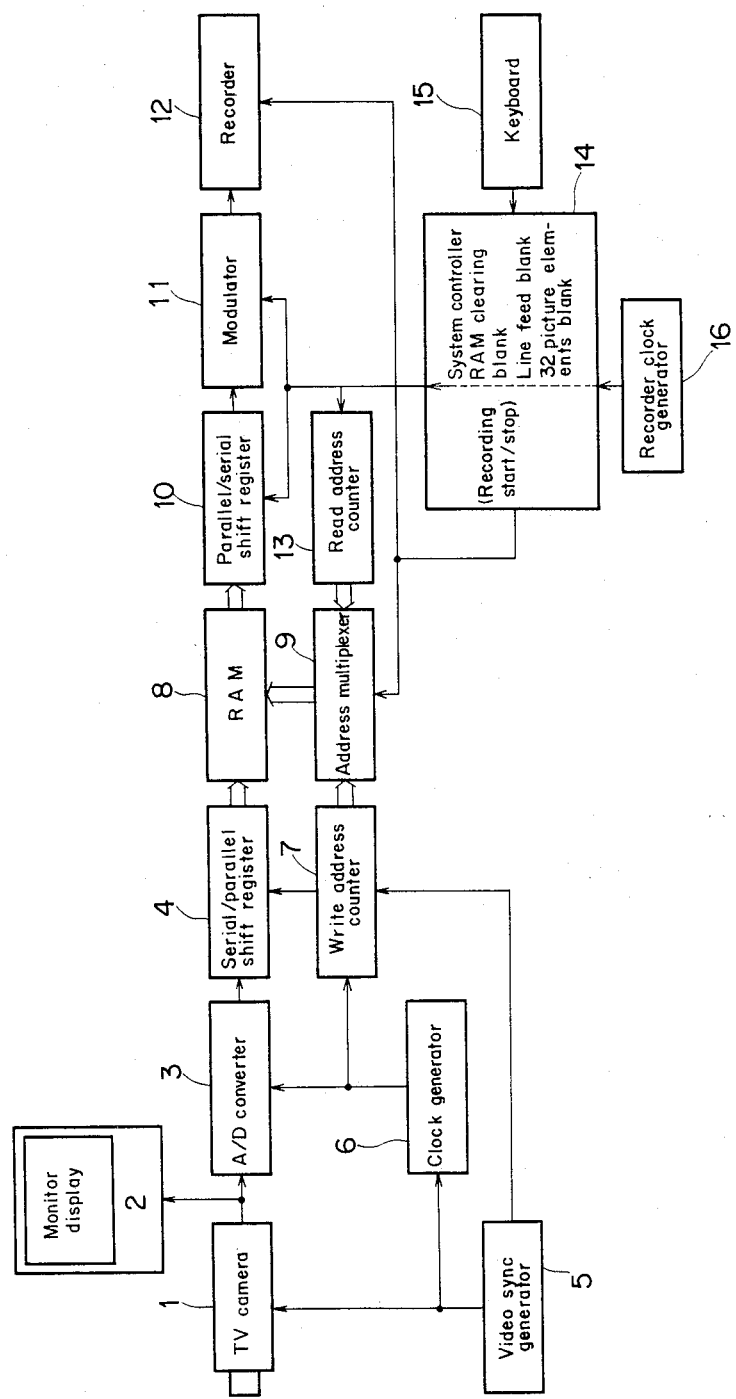
FIG. 1 is a block diagram showing as an example the circuit of the recording system arrangement which achieves the method of the present invention.

FIG. 1 shows in block diagram the system for recording character signal on the magnetic tape, and the system includes a television camera 1, a monitor CRT display 2, an A/D converter 3 for transforming a luminance character signal from the television camera 1 into binary picture element signals, a serial-to-parallel converting shift register 4 for converting serial picture element signals from the A/D converter 3 into parallel data, a video sync signal generator 5, a clock generator 6, and a write address counter 7 which receives sync signals from the video sync signal generator 5 and clock signals from the clock generator and provides latch pulses for the shift register 4 at every eight picture elements and at the same time provides the write address for address multiplexer 9. The system further includes a RAM 8 for storing eight picture element data from the shift register 4 in response to the output of the address multiplexer 9 which specifies the location in the RAM 8 in accordance with the output from the write address counter 7 for storing eight picture element data and also specifies the location in the RAM 8 in accordance with the output of a read address counter 13 for reading out eight picture element data which have been stored, a parallel-to-serial converting shift register 10 for converting the parallel picture element data from the RAM 8 into a serial signal, and a modulator 11 which modulates a picture element signal at logical "0" into the first wave having a frequency of, for example, 3000 Hz and a picture element signal at logical "1" into the second wave having a frequency of, for example, 6000 Hz. The system further includes a recorder 12 having a recording head, a read address counter 13 for switching the address multiplexer 9 in response to the clock signal from a recorder clock generator 16 for generating clock pulses in 3000 Hz, and, a system controller 14 which produces blank signals for clearing the RAM 8, line feed and 32 picture elements in response to the operation on keyboard 15 so as to control the start and halt of recording.

The operation of the foregoing arrangement will be described. First, the television camera 1 is operated in synchronization with the 5 MHz signal produced by the video sync signal generator 5, and the operator takes the picture of a text card with eight-line sentence witten thereon while positioning the camera by viewing the monitor CRT display 2.

The clock generator 6 produces 256 clock pulses (32×8 lines) in one horizontal scanning operation, and the A/D converter 3 quantizes the luminance image of characters, as picture information, into a total of 6144 picture elements (32 picture elements per line by 192 lines) sequentially. The quantized picture element data is sent to the serial-to-parallel converting shift register 4 and the converted 8-bit data is stored in the RAM 8.

The write address counter 7 produces a latch pulse from sync signals from the video sync signal generator 5 and clock pulses for each 8-bit picture element data and sends it to the shift register. At the same time, the counter 7 provides the write address for the address multiplexer 9.

The picture element signal produced in the form of pulses by quantizing the picture information by means of the 5 MHz clock has a frequency which is too high for the signal to be recorded on the magnetic tape, and the signal must be converted into a signal in an audio frequency band as a "character signal". The frequency of said "character signal" is determined by the character formation speed during reproduction, and if, for example, a line of characters are to be displayed on the screen in 2–3 seconds, the necessary signal frequency ranges from 6144/3=2048 Hz to 6144/2=3072 Hz. This frequency approximates the reproduction frequency of the common magnetic tape, and a high quality picture reproduction can be expected.

The 3000 Hz clock signal is produced by the recorder clock oscillator 16. The system controller 14 is controlled by the board 15, and the address multiplexer 9 is controlled by the start and stop signals for the recorder 12. The start/stop signals are also used to exchange the write address with the read address derived from the recorder clock signal by the read address counter 13. Picture element data is read out from the RAM 8 and converted into a serial signal by the parallel-to-serial shift register 10 in response to clock pulses from the recorder clock generator 16. Then the modulator 11 modulate a sine wave signal with a picture element signal at "0" into the first wave of 3000 Hz and a picture element signal at "1" into the second wave of 6000 Hz, and sends the modulated signal to the recorder 12. Thus the character signal is recorded on the magnetic tape.

However, the foregoing operation merely produces picture element signals consecutively, and it is necessary to record the partition, line feed and erasure commands in order to reproduce original characters on the screen.

Recording of these commands as digital bits codes as have practiced commonly in the prior art system makes the decoding circuit complex and expensive, and therefore the present invention employs a new system in which signal interruption periods (unrecorded portions or blank portions) are placed in the record so that each blank represents a command based on the time length of the blank. Arrangement is made such that a 2-wave blank represents a partition for 32 picture elements, a 0.5-second blank represents a line feed command and a blank of 1 second or longer represents a RAM clearing command. In more detail, the 32 picture element blank is produced by the system controller 14 by halting the signal for a duration of two waves, and the blanks for the line feed command and RAM clearing command are produced by muting the signal from the modulator 11 for durations corresponding to the commands in response to the operation of respective keys provided on the keyboard 15. This method merely causes a disturbance on the display due to a dropout of the recording signal, posing no practical problem, and the circuit arrangement and thus the whole system can be simplified.

The operation for taking picture and recording for each line of the screen is repeated, and the character signal is recorded in the second channel of the magnetic tape in parallel to an audio signal for karaoke in the first channel.

The method of recording the signals on the magnetic tape has been described. The following will describe in connection with FIG. 2 the method of reproducing the signals recorded on the magnetic tape.

Figure 2:
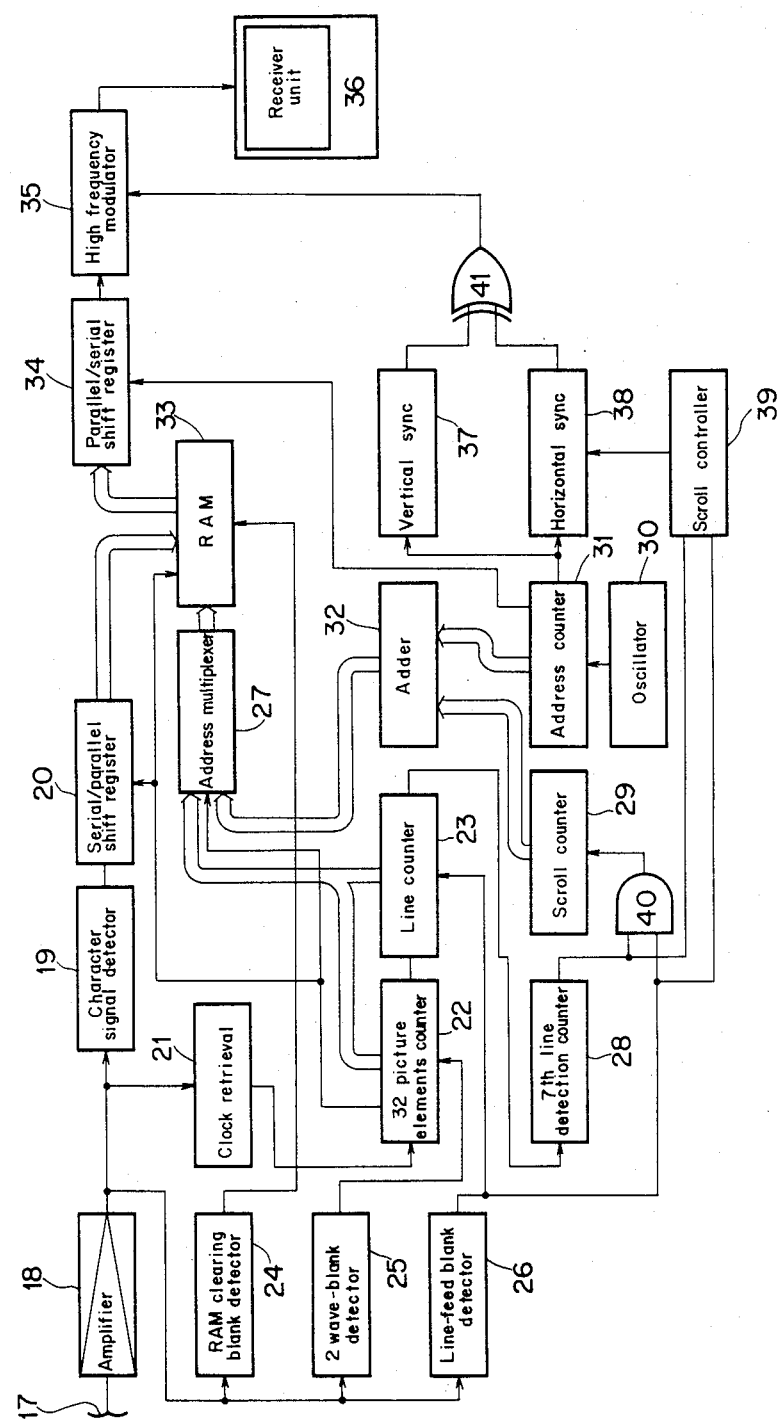
FIG. 2 is a block diagram showing the reproduction system for achieving the method of the present invention.

The arrangement of FIG. 2 includes a magnetic head 17, an amplifier 18, a character signal detection circuit 19, a serial-to-parallel converting shift register 20 for converting the signal from the detection circuit 19 into parallel data, a clock reproducing circuit 21 for detecting the clock signal in the signal from the amplifier 18a 32 picture element counter 22 for partitioning the character signal at every 32 picture elements basing on the clock signal from the circuit 21 a line counter 23 for partitioning the character signal at every line basing on the output of the line-feed blank detection circuit 26, detection circuits 24, 25 and 26 for detecting the RAM clearing blank, 2-wave blank and line feed blank, respectively, included in the signal from the amplifier 18, an address multiplexer 27 for selecting the write address and read address at every eight picture elements so as to write and read the RAM 33, a 7th line detection counter 28 which counts the line output signals from the line counter 23 and provides an output at each 7th line, a scroll counter 29 which generates the address signal for line shift on the screen in response to the output of AND gate 40 which receives the outputs from the 7th line detection circuit 28 and the line feed blank detection circuit 26, an oscillator 30 for generating the 5 MHz video sync signal, an address counter 31, an adder 32 for adding the address signal produced by the scroll counter 29 and the address signal produced by the address counter 31, a RAM 33, a parallel-to-serial converting shift register 34 for converting the character signal read out of the RAM 33 into a serial signal, a high frequency modulation circuit 35, and a receiver unit 36. The arrangement further includes a vertical sync circuit 37 and horizontal sync circuit 38 for providing the vertical and horizontal sync signals through OR gate 41 to the high frequency modulation circuit 35, and a scroll controller 39 shown in detail in FIG. 3 which performs a slow line movement in order that the reader can easily follow words on the screen, by supplying the line feed signal to the horizontal sync circuit 38 so as to vary the interval of the horizontal sync signal slowly.

The arrangement of FIG. 3 includes transistors Q1 through Q4, resistors R1 and R2 and a capacitor C1 constituting a time constant circuit, a light emitting diode D1, a photosensitive element Z such as a CdS device, a resistor R3 and a capacitor C2 constituting a time constant circuit, and one-shot multivibrators M1 and M2.

The arrangement of FIG. 3 operates as follows. When the specified number of lines (seven lines in this embodiment) have been displayed on the screen, the 7th line detection counter 28 provides an low output, causing the transistor Q1 to be cut off, and the system enters the state which allows scrolling. Subsequently, when the line-feed blank detection circuit 26 provides the line feed signal at a low level, the transistor Q2 is cut off and the current in the light emitting diode D increases gradually in accordance with the time constant determined from the values of the resistors R1 and R2 and the capacitor C1. Consequently, the time constant of the circuit constituted by the photosensitive element Z, resistor R3 and capacitor C2 decreases, causing the horizontal sync signal to advance relative to the picture signal, then the displayed picture will move slowly to the right. After that, when the line feed signal rises, the transistor Q2 becomes conductive to discharge the capacitor C1 instantaneously, and the circuit is set to the next scrolling operation.

The following will describe the operation of the circuit arrangement shown in FIG. 2. In reproducing signals recorded on the magnetic tape by the recording system shown in FIG. 1, the character signal is picked up by the magnetic head 17 and then amplified to a certain level by the amplifier 18. The amplified character signal is separated into character signals, clock signals and blank signals. Character signals in 3000 Hz and 6000 Hz detected by the character signal detection circuit 19 are converted into parallel data by the serial-to-parallel converting shift register 20, then stored in the RAM 33. The clock reproduction circuit 21 retrieves the clock signal to operate the 32 picture element counter 22 and the line counter 23, which then provide the write address signal for the RAM 33. The signal detected by the 2-wave blank detection circuit is used to control the 32 picture element counter 22 so as to partition the signal at every 32 picture elements. The line-feed blank detection circuit 26 detects the 0.5-second blank and operates on the line counter 23 to partition the signal at every line. The RAM clearing blank detection circuit 24 detects a blank lasting one second or longer and clear the RAM 33 so that the entire screen of the receiver unit 36 is erased.

The 7th line detection counter 28 detects the seventh line, causing the line-feed blank detection circuit 26 to send a signal to the scroll counter 29, and the address signal for moving character lines on the screen is produced. The oscillator 30 provides the 5 MHz video sync signal for the address counter 31, and the address signal produced in the counter is added to the address signal produced by the scroll counter 29 by the adder 32, then resultant read address signal is fed to the address multiplexer 27. The address multiplexer 27 switches the write address and the read address for the RAM 33 at every eight picture elements. The character data read out of the RAM 33 is converted into a serial signal by the parallel-to-serial converting shift register 34, then fed to the high frequency modulation circuit 35. The high frequency modulation circuit 35 mixes the character signal with the sync signals produced by the vertical sync circuit 37 and horizontal sync circuit 38, and a picture carried by the character signal is displayed on the receiver unit 36.

The conventional scrolling system moves lines of characters instantaneously, causing the reader to lose the reading position. On this account, the inventive system includes the scroll controller 39 as described above and shown in FIG. 3, so that the interval of the horizontal sync signal varies slowly to thereby move lines of characters slowly. After character lines have been moved, the display address is shifted and at the same time the sync signals are restored.

Although the foregoing embodiment is the system for recording and reproducing signals on the magnetic tape, the present invention can of course be applied to the system using the audio disk.

According to the present invention, as described above, images of characters are transformed into picture element signals, which are used to modulate a signal in the audio frequency band. The modulated signal is added by blank signals (unrecorded portions) with different durations for representing commands for word start, line feed and RAM clearing to form the character signal. By reproducing the character signal on the audio magnetic tape or disk, original characters can be displayed on the screen of the receiver unit. Thus the simple method performs recording and reproduction, allowing the manufacturing of a low cost display system. Use of blanks for the commands of word start, line feed and RAM clearing is further effective for achieving a low cost display system.

Although an audio signal is recorded in the first channel while the character signal in the second channel in the above embodiment, the invention can be applied to a recording medium having one channel alone, in which only the character signal is recorded. Such a recording medium finds application to various teaching purposes giving, first, a problem and, then, an answer.

It is intended, therefore, that all matter contained in the foregoing description and in the drawings shall be interpreted as illustrative not as limitative of the invention.

What is claimed is:

1. A method of recording visual information in an audio recording medium and reproducing the same comprising the steps of:
   quantizing a signal from a television camera photographing letters and characters by means of clock pulses having a certain frequency to produce two kinds of pulse signals;
   modulating said two kinds of pulse signals into two kinds of sine waves each having a specific audio frequency band;
   adding blank portions to said two kinds of sine waves at predetermined intervals to form a character signal, said blank portions having time durations of their own respectively;
   recording said character signal on an audio recording medium;
   picking up said character signal from said recording medium; and
   processing said picked-up character signal by separate means according to said sine waves and said blank portions, said sine waves being reproduced on a screen in the form of photographed letters and characters, said blank portions being used as command signals including a command for starting reproduction on the screen of words, a command for vertical line feeding, and a command to clear the screen.

2. A method according to claim 1, further including the step of performing a slow vertical line feeding for said reproduced letters and characters.

3. A method according to claim 2, wherein said line feeding is effected upon the screen overflowing with letters and characters.

4. A method according to claim 1, wherein said recording step includes the step of recording an audio signal together with said character signal, said audio recording medium having a first channel and a second channel, said audio signal and said character signal being recorded in the first and second channels, respectively.

* * * * *